United States Patent
Ga et al.

(10) Patent No.: US 12,157,475 B2
(45) Date of Patent: Dec. 3, 2024

(54) APPARATUS, METHOD AND COMPUTER READABLE STORAGE MEDIUM FOR COMPUTING TORQUE OF ELECTRIC VEHICLE FOR EXITING DRIFT DRIVING

(71) Applicants: HYUNDAI MOTOR COMPANY, Seoul (KR); KIA CORPORATION, Seoul (KR)

(72) Inventors: Han Seon Ga, Gwangmyeong-si (KR); Sang Wook Han, Seoul (KR); Ki Soo Park, Hwaseong-si (KR); Yong Hwa Lee, Gwacheon-si (KR); Woo Pyeong Seo, Gwangmyeong-si (KR); Jin Seok Song, Bucheon-si (KR); Ho Wook Lee, Seoul (KR); So Ra Jang, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 399 days.

(21) Appl. No.: 17/704,823

(22) Filed: Mar. 25, 2022

(65) Prior Publication Data
US 2023/0166741 A1    Jun. 1, 2023

(30) Foreign Application Priority Data
Nov. 30, 2021    (KR) .................. 10-2021-0169182

(51) Int. Cl.
*B60W 40/10* (2012.01)
*B60W 40/09* (2012.01)

(52) U.S. Cl.
CPC ............ *B60W 40/10* (2013.01); *B60W 40/09* (2013.01); *B60W 2510/0657* (2013.01);
(Continued)

(58) Field of Classification Search
CPC ................ B60W 40/10; B60W 40/09; B60W 2554/4045; B60W 2540/30;
(Continued)

(56) References Cited

U.S. PATENT DOCUMENTS

| 11,318,924 B1* | 5/2022 | Kapoor | ................ B60K 17/354 |
| 11,952,010 B1* | 4/2024 | Roy | ..................... B62D 15/021 |

(Continued)

FOREIGN PATENT DOCUMENTS

| CN | 111824257 A | 10/2020 |
| DE | 102009029459 A1 | 3/2011 |

(Continued)

OTHER PUBLICATIONS

Extended European Search Report dated Sep. 9, 2022, issued in corresponding European Patent Application No. 22164012.1.

*Primary Examiner* — Peter D Nolan
*Assistant Examiner* — Wae L Louie
(74) *Attorney, Agent, or Firm* — MORGAN, LEWIS & BOCKIUS LLP

(57) ABSTRACT

An apparatus for calculating torque of a vehicle for exiting drift driving may include a processor and a non-transitory computer-readable storage medium storing a program which, when executed by the processor, causes: determining a driver's intention to exit drift driving based on an opening degree of an accelerator pedal and a steering angle; and calculating target torque of a front wheel motor based on the opening degree of the accelerator pedal when the driver's intention to exit drift driving is determined.

17 Claims, 6 Drawing Sheets

(52) U.S. Cl.
CPC ..... *B60W 2510/18* (2013.01); *B60W 2510/20* (2013.01); *B60W 2540/30* (2013.01); *B60W 2554/4045* (2020.02)

(58) Field of Classification Search
CPC ..... B60W 2510/0657; B60W 2510/18; B60W 2510/20
See application file for complete search history.

(56) References Cited

U.S. PATENT DOCUMENTS

| | | | | |
|---|---|---|---|---|
| 2015/0203110 | A1* | 7/2015 | Moerbe | B60T 8/1706 |
| | | | | 701/72 |
| 2018/0170377 | A1* | 6/2018 | Tatsukawa | B60W 30/12 |
| 2019/0337385 | A1* | 11/2019 | Lim | B60K 23/0808 |
| 2020/0324649 | A1* | 10/2020 | Gully | B60W 10/06 |
| 2021/0284262 | A1* | 9/2021 | Sardes | B60W 10/22 |
| 2022/0024306 | A1* | 1/2022 | O'Rourke | B60K 17/354 |
| 2022/0258707 | A1* | 8/2022 | Jang | B60T 8/3205 |
| 2022/0363283 | A1* | 11/2022 | Prill | B60W 40/08 |
| 2022/0379855 | A1* | 12/2022 | Goh | B60T 8/1755 |
| 2023/0138305 | A1* | 5/2023 | Kulas | B60W 30/02 |
| | | | | 701/38 |
| 2023/0166741 | A1* | 6/2023 | Ga | B60W 40/10 |
| | | | | 701/1 |
| 2024/0166216 | A1* | 5/2024 | Park, II | B60W 40/13 |

FOREIGN PATENT DOCUMENTS

| | | |
|---|---|---|
| FR | 2989326 A1 | 10/2013 |
| KR | 10-2019-0127433 A | 11/2019 |

* cited by examiner

APPARATUS, METHOD AND COMPUTER READABLE STORAGE MEDIUM FOR COMPUTING TORQUE OF ELECTRIC VEHICLE FOR EXITING DRIFT DRIVING

CROSS-REFERENCE TO RELATED APPLICATION(S)

This application claims benefit of priority to Korean Patent Application No. 10-2021-0169182 filed on Nov. 30, 2021 in the Korean Intellectual Property Office, the disclosure of which is incorporated herein by reference in its entirety.

TECHNICAL FIELD

The present disclosure relates to an apparatus, a method and a computer readable storage medium for calculating torque of an electric vehicle for exiting drift driving.

BACKGROUND

Drift driving is a driving method in which a driver intentionally slides a rear wheel while maintaining control of a vehicle in order to maintain a high exit speed in a corner, thereby causing oversteering and passing the corner. In an electric vehicle, the above-described drift driving may be implemented by distributing torque to only a rear wheel motor.

SUMMARY

An aspect of the present disclosure is to provide an apparatus, a method, and a computer-readable storage medium for calculating torque of a vehicle for exiting drift driving.

In addition, an aspect of the present disclosure is to provide an apparatus, a method, and a computer-readable storage medium for accurately setting target torque of a front wheel motor required for exiting drift driving, and preventing non-linear behavior of the vehicle due to abrupt torque application.

According to an aspect of the present disclosure, an apparatus for calculating torque of a vehicle for exiting drift driving is provided. The apparatus may include a processor and a non-transitory computer-readable storage medium storing a program which, when executed by the processor, causes the processor to perform: determining a driver's intention to exit drift driving based on an opening degree of an accelerator pedal and a steering angle; and calculating target torque of a front wheel motor based on the opening degree of the accelerator pedal when the driver's intention to exit drift driving is determined.

According to an aspect of the present disclosure, a method for calculating torque of a vehicle for exiting drift driving is provided. The method may include a first operation of determining a driver's intention to exit drift driving based on an opening degree of an accelerator pedal and a steering angle; and a second operation of calculating target torque of a front wheel motor based on the opening degree of the accelerator pedal, when the driver's intention to exit drift driving is determined.

According to an aspect of the present disclosure, a non-transitory computer-readable storage medium may store a program which, when executed by a processor, causes the processor to perform the method.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
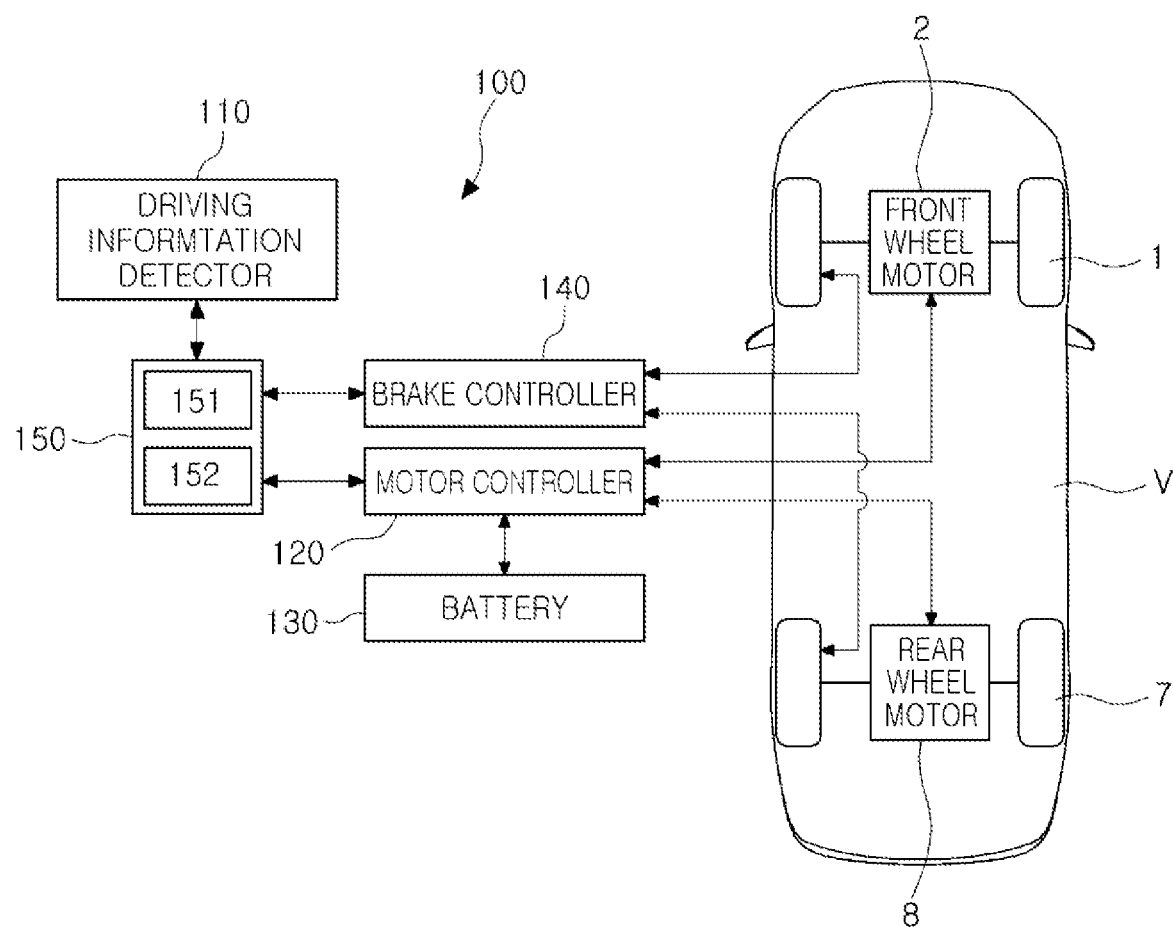
FIG. 1 is a block diagram of an overall system including an apparatus for calculating torque of a vehicle according to an embodiment of the present disclosure.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity.

FIG. 1 is a block diagram of an overall system 100 including an apparatus 150 for calculating torque of a vehicle according to an embodiment of the present disclosure.

In illustrating the present disclosure, a vehicle V illustrated in FIG. 1 may be an All-Wheel Drive (AWD) electric vehicle having a front wheel motor 2 for driving a front wheel 1 and a rear wheel motor 8 for driving a rear wheel 7, respectively. Also, in illustrating the present disclosure, the vehicle V is illustrated on a premise that it is an electric vehicle, but the vehicle V may also be an internal combustion engine vehicle in which the front wheel 1 and the rear wheel 7 may be driven independently.

In addition, the present invention is based on the premise that the above-described vehicle V is in a drift driving state, and how the vehicle exits the drift driving state, that is, the purpose of the present disclosure is that how to determine a driver's intention to exit drift driving, and how to obtain the target torque of the front wheel motor 2 when the driver's intention to exit drift driving is determined.

First, a driving information detector 110 may detect a state of the vehicle V and transmit the same to the apparatus 150 for calculating torque.

To this end, the driving information detector 110 may include a sensor for detecting an opening degree of an accelerator pedal, a sensor for detecting a steering angle, a sensor for measuring acceleration in a longitudinal or a lateral direction, and the like.

Meanwhile, the motor controller 120 may control driving and torque of motors 2 and 8 according to the torque transmitted from the apparatus 150 for calculating torque, and store electricity generated from the motors 2 and 8 during regenerative braking to a battery 130. To this end, one or a plurality of microprocessors may be provided in the motor controller 120, and the one or a plurality of microprocessors may be operated by a program set to execute a method for driving the motors 2 and 8 and controlling the torque.

The battery 130 may be comprised of a plurality of unit cells, and supply a driving voltage to the motors 2 and 8, and may be charged with a voltage generated by the motors 2 and 8 during regenerative braking.

Meanwhile, the brake controller 140 may control a brake by controlling hydraulic pressure supplied to brake cylinders of respective driving wheels 1 and 7. For this purpose, one or a plurality of microprocessors may be provided in the brake controller 140, and the one or the plurality of microprocessors may operate according to a program set for executing a method for controlling hydraulic pressure.

Meanwhile, the torque calculating apparatus 150 may include a determination unit 151 and torque calculating unit 152.

The determination unit 151 of the apparatus for calculating torque 150 may determine a driver's intention to exit drift driving based on an opening degree of an accelerator pedal and a steering angle.

According to an embodiment of the present disclosure, the determination unit 151 may determine that there is a driver's intention to exit drift driving when the steering angle is less than a first reference steering angle and the opening degree of the accelerator pedal is greater than a first reference opening degree.

Figure 2:
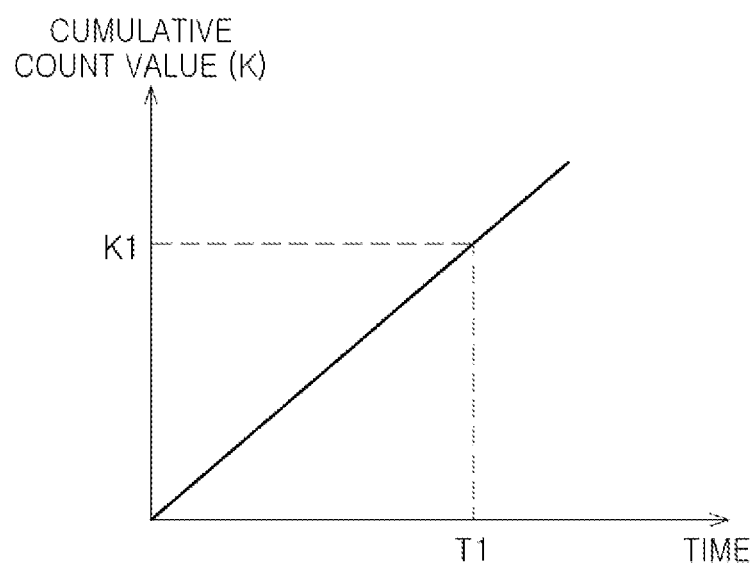
FIG. 2 is a view illustrating a process of obtaining a cumulative count value for determining an intention to exit drift driving according to an embodiment of the present disclosure.

FIG. 2 is a view illustrating a process of obtaining a cumulative count value for determining a driver's intention to exit drift driving according to an embodiment of the present disclosure.

Specifically, as illustrated in FIG. 2, the determination unit 151 may count a time at which the steering angle is less than a first reference steering angle and the opening degree of the accelerator pedal is greater than a reference opening degree and cumulate the same, and in this case, when a cumulative count value K is greater than or equal to a preset first cumulative count value K1, the determination unit 151 may determine that there is an intention to exit drift driving.

That is, as illustrated in FIG. 2, a point in time T1 at which the cumulative count value K is a first cumulative count value K1 may be determined as a point in time at which there is an intention to exit drift driving.

Meanwhile, the determination unit 151 may count a time at which the steering angle is less than a first reference steering angle and an opening degree of an accelerator pedal is greater than a reference opening degree. When the steering angle is greater than a second reference steering angle, the second steering angle being greater than the first steering angle, the determination unit 151 may reset a cumulative count value K. This is because, in this case, it may be determined that the driver desires drift driving again.

Here, the second reference steering angle may be a value, greater than the first reference steering angle, which is to provide a dead time to prevent frequent reset. It should be noted that the second reference steering angle and the first steering angle as described above are not limited to specific values in the present disclosure, since the second reference steering angle and the first steering angle, described above are values that can be set according to needs of those skilled in the art.

Meanwhile, when the driver's intention to exit drift driving is determined, the torque calculating unit 152 of the torque calculating apparatus 150 may calculate a target torque of the front wheel motor 2 based on the opening degree of the accelerator pedal.

According to an embodiment of the present disclosure, the torque calculating unit 152 may calculate the target torque of the front wheel motor 2 by multiplying the required torque according to the opening degree of the accelerator pedal by a sensitivity factor SF according to the opening degree of the accelerator pedal and a weight factor WF according to the cumulative count value K. Hereinafter, a process of calculating the target torque of the front wheel motor will be described in detail with reference to FIG. 3.

Figure 3:
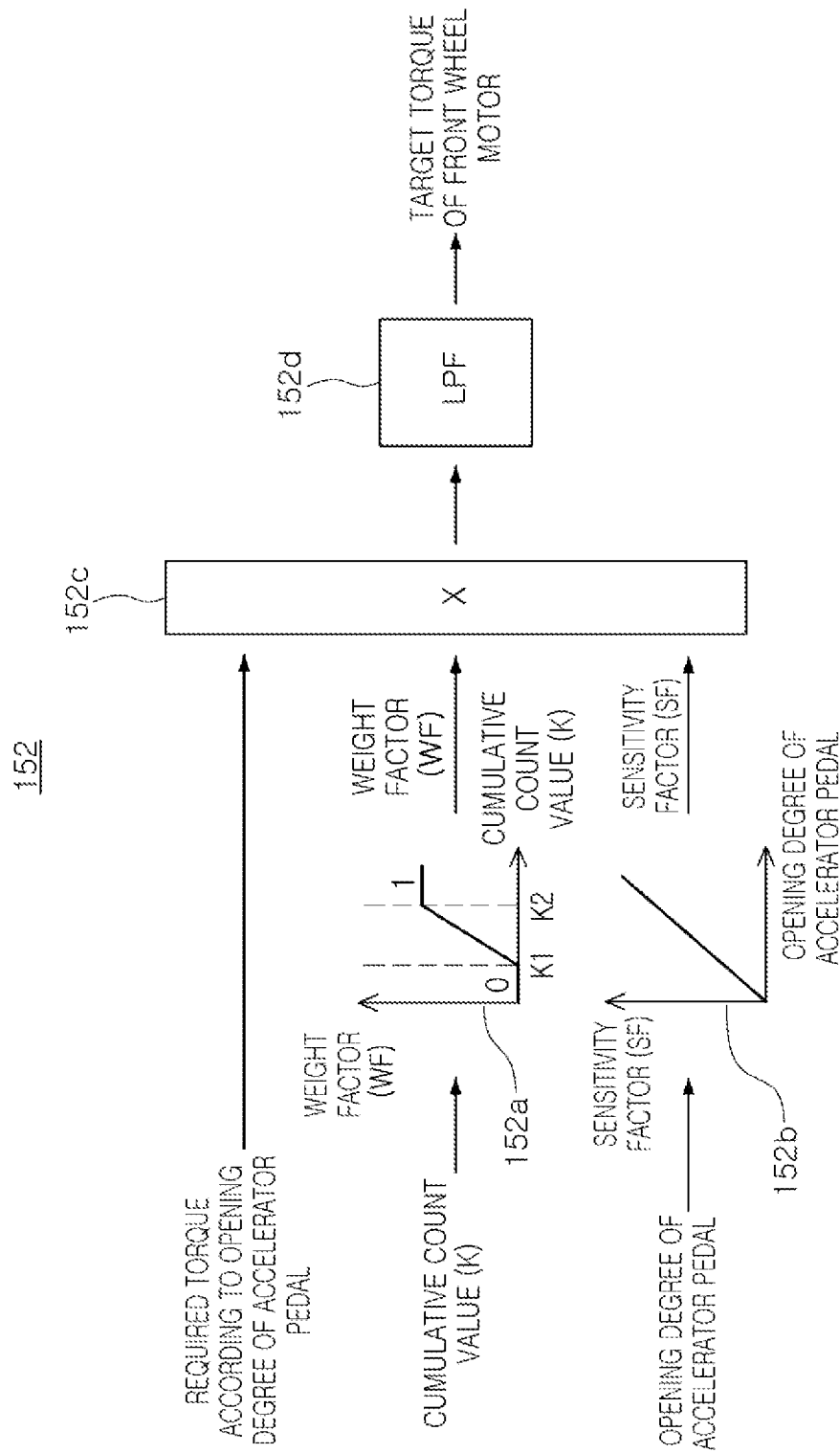
FIG. 3 is a view illustrating a process of calculating a target torque of a front wheel motor according to an embodiment of the present disclosure.

FIG. 3 is a view illustrating a process of calculating a target torque of a front wheel motor according to an embodiment of the present disclosure.

As illustrated in FIG. 3, first, the torque calculating unit 152 may be configured to multiply required torque according to an opening degree of an accelerator pedal by a sensitivity factor SF according to an opening degree of an accelerator pedal using a multiplier 152c.

Here, the required torque according to the opening degree of the accelerator pedal is torque distributed to the front wheel motor 2 among the total required torque according to the opening degree of the accelerator pedal, and may have a preset value. The required torque according to the opening degree of the accelerator pedal may be less than or excessive to target torque required to exit drift driving.

Accordingly, in the present disclosure, the target torque of the front wheel motor required for exiting drift driving can be accurately set by multiplying the required torque having a preset value by the sensitivity factor to obtain the target torque.

The above-described sensitivity factor SF is a factor for changing a magnitude of the required torque according to the opening degree of the accelerator pedal, and a relationship between the opening degree of the accelerator pedal and the sensitivity factor SF may be implemented in a form of a linear function as shown in reference numeral 152b, but it should be noted that it is not necessarily limited to only the linear function.

The torque calculating unit 152 may calculate a target torque of the front wheel motor 2, by extracting the sensitivity factor SF according to the opening degree of the accelerator pedal with reference to the relationship 152b between the opening degree of the accelerator pedal and the corresponding sensitivity factor, and multiplying the extracted sensitivity factor SF by the required torque described above using a multiplier 152c.

Thereafter, the torque calculating unit 152 may calculate the target torque according to the cumulative count value K by multiplying the calculated target torque by the weight factor WF according to the cumulative count value.

Here, the weight factor WF may have a value, proportional to the cumulative count value to reach the target torque at a point in time at which the cumulative count value K becomes a second cumulative count value K2, greater than the first cumulative count value K1.

It should be noted that the relationship between the cumulative count value K and the weight factor WF may be implemented in a form of a linear function as shown in a reference numeral 152a, but is not necessarily limited to the linear function.

The torque calculating unit 152 may obtain a target torque according to the cumulative count value K, by multiplying the weight factor WF corresponding to the cumulative count value K and the target torque using a multiplier 152c with reference to the relationship 152a between the cumulative count value K and the weight factor WF.

Also, according to an embodiment of the present disclosure, the torque calculating apparatus 150 may further include a low-pass filter 152d to remove noise of the target torque according to the cumulative count value K.

Figure 4A:
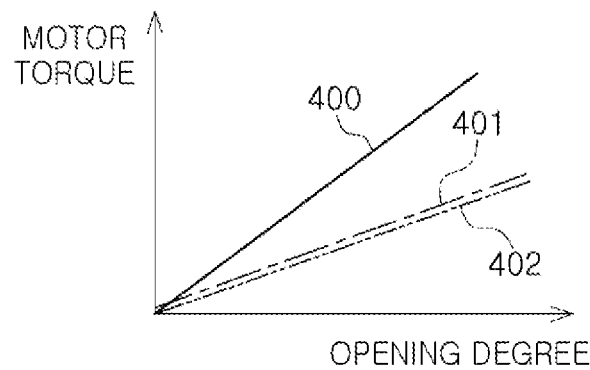
FIGS. 4A to 4C are views for comparing and illustrating a motor torque during normal driving and drift driving, and when exiting drift driving.
Figure 4B:
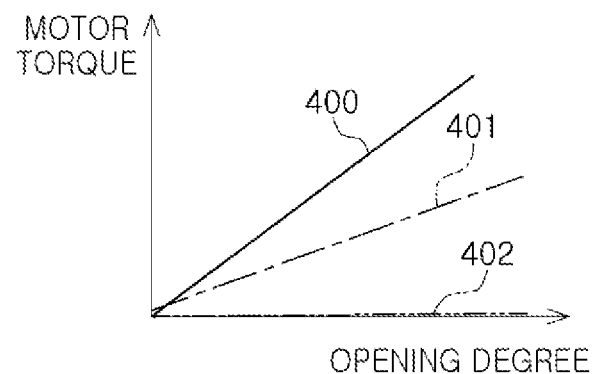
Figure 4C:
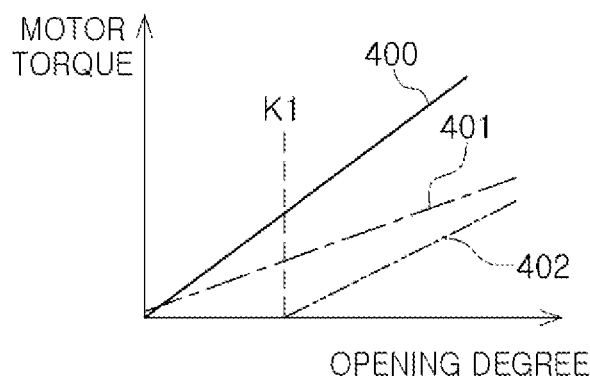

Meanwhile, FIGS. 4A to 4C are views for comparing and illustrating a motor torque during normal driving and drift driving and during exiting drift driving, FIG. 4A illustrates torque applied to the front wheel motor 2 and the rear wheel motor 8 during normal driving, FIG. 4B illustrates torque applied to the front wheel motor 2 and the rear wheel motor 8 during drift driving, and FIG. 4C illustrates torque applied to the front wheel motor 2 and the rear wheel motor 8 during exiting drift driving. In addition, a reference numeral 400 may denote a total required torque according to the opening degree of the accelerator pedal, a reference numeral 401 may denote torque applied to the rear wheel motor 8 among the total required torque, and a reference numeral 402 may denote torque applied to the front wheel motor 2 among the total required torque.

As illustrated in FIG. 4A, in normal driving, the total required torque 400 according to the opening degree of the accelerator pedal is distributed to the front wheel motor 2 and the rear wheel motor 8 according to the opening degree of the accelerator pedal at a constant ratio and applied thereto.

As illustrated in FIG. 4B, during drift driving, torque is applied only to the rear wheel motor 8 according to the opening degree of the accelerator pedal, whereas torque is not applied to the front wheel motor 2. Thereby, slip can be induced in the rear wheel 7, and drift driving may be performed.

As illustrated in FIG. 4C, when exiting drift driving, it can be seen that the torque 402 also gradually increases in the front wheel motor 2 from a point in time at which the cumulative count value K is a first cumulative count value K1.

Figure 5:
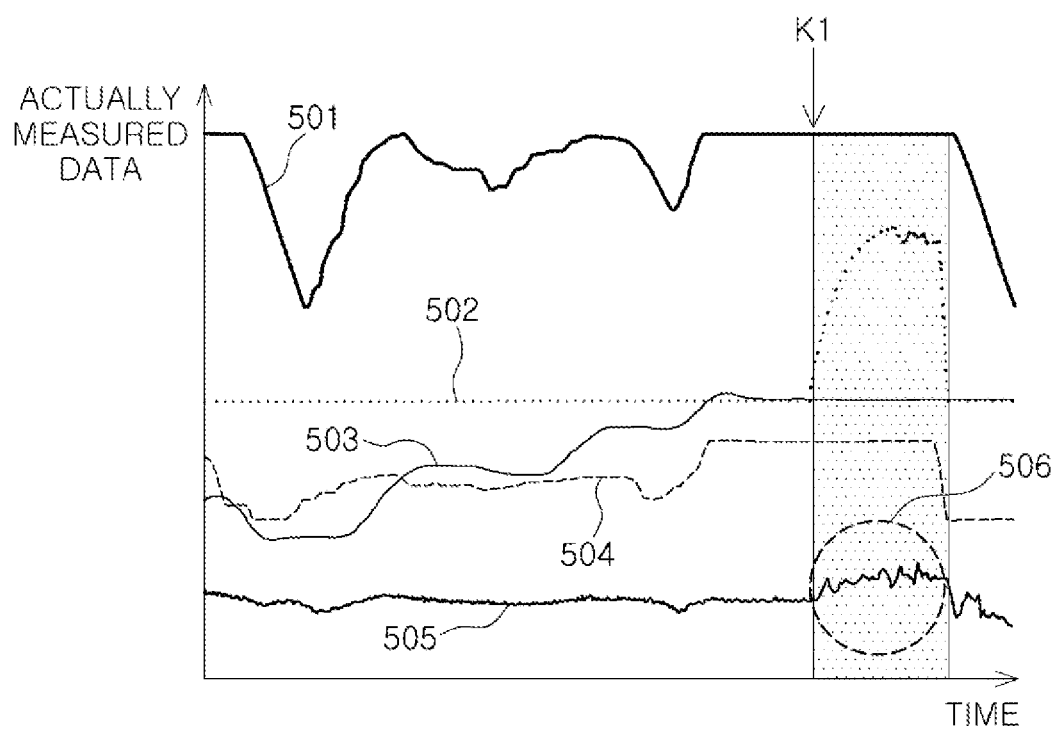
FIG. 5 is a diagram illustrating actually measured data according to an embodiment of the present disclosure.

Meanwhile, FIG. 5 is a diagram illustrating actually measured data according to an embodiment of the present disclosure. In FIG. 5, a reference numeral 501 may denote torque of the rear wheel motor 8, a reference numeral 502 may denote torque of the front wheel motor 2, a reference numeral 503 may denote a steering angle, a reference numeral 504 may denote an opening degree of the accelerator pedal, and a reference numeral 505 may denote acceleration in a longitudinal direction.

As illustrated in FIG. 5, when exiting drift driving, it can be seen that acceleration 505 in a longitudinal direction also increases as the torque 502 of the front wheel motor 2 gradually increases from a point in time at which the cumulative count value K is a first cumulative count value K1, and both the front wheel motor 2 and the rear wheel motor 8 are driven.

As described above, according to an embodiment of the present disclosure, in a vehicle during drift driving, the driver's intention to exit drift driving may be determined based on the opening degree and the steering angle of the accelerator pedal, and thereafter, by driving the front wheel motor by calculating the target torque of the front wheel motor based on the opening degree of the accelerator pedal, and it is possible to exit drift driving.

In addition, according to an embodiment of the present disclosure, when calculating the above-described target torque, the target torque of the front wheel motor required for exiting drift driving may be accurately set by multiplying a magnitude of the preset required torque according to the opening degree of the accelerator pedal by the sensitivity factor according to the opening degree of the accelerator pedal.

In addition, according to an embodiment of the present disclosure, by multiplying the above-described target torque by a weight factor according to the cumulative count value, the target torque applied to the front wheel motor may be smoothly increased, thereby preventing non-linear behavior of the vehicle due to abrupt torque application.

Figure 6:
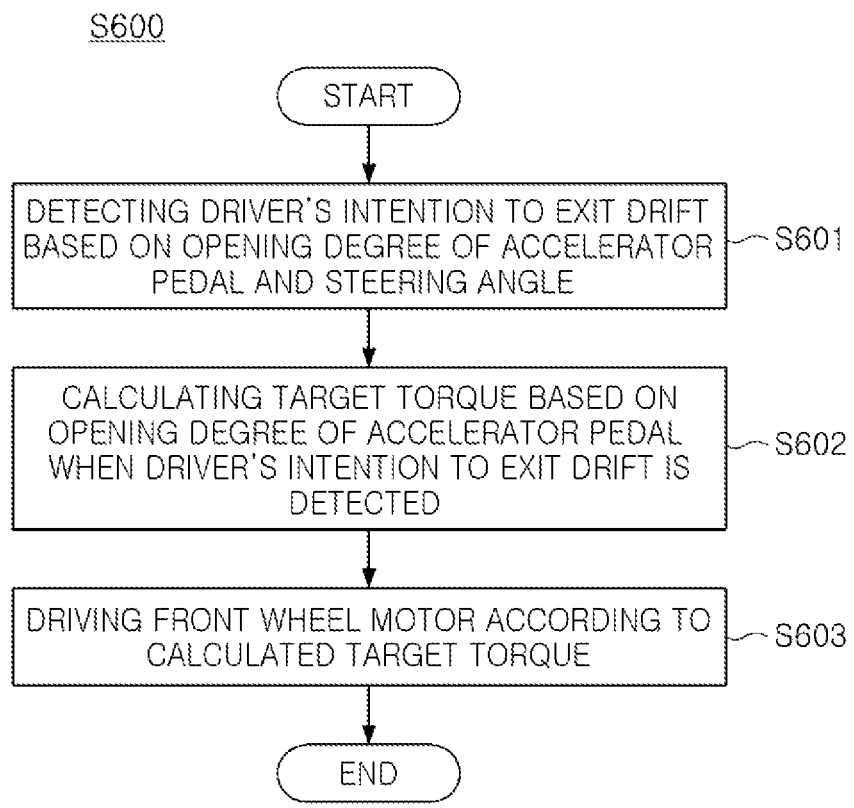
FIG. 6 is a flowchart illustrating a method of calculating torque of a vehicle according to an embodiment of the present disclosure.

FIG. 6 is a flowchart illustrating a method of calculating torque of a vehicle according to an embodiment of the present disclosure.

Hereinafter, a method (S600) of calculating the torque of a vehicle according to an embodiment of the present disclosure will be illustrated with reference to FIGS. 1 to 6.

Referring to FIGS. 1 to 6, the method (S600) of calculating torque of a vehicle according to an embodiment of the present disclosure may be initiated by the operation of determining a driver's intention for exiting drift driving based on an opening degree of an accelerator pedal and a steering angle in the determination unit 151 (S601).

According to an embodiment of the present disclosure, the determination unit 151 may determine that there is an intention to exit drift driving when the steering angle is less than a first reference steering angle, and the opening degree of the accelerator pedal is greater than a first reference opening degree.

Specifically, as described above, the determination unit 151 may count a time at which the steering angle is less than a first reference steering angle and the opening degree of the accelerator pedal is greater than a first reference opening degree and cumulate the same, and in this case, when a cumulative count value K is greater than or equal to a first cumulative count value K1, the determination unit 151 may determine that there is an intention for exiting drift driving.

Meanwhile, according to the embodiment of the present disclosure, as described above, the determination unit 151 may count a time at which the steering angle is less than a first reference steering angle and the opening degree of the accelerator pedal is greater than a reference opening degree, and reset a cumulative count value K when the steering angle is greater than a second reference steering angle.

Next, when a driver's intention to exit drift driving is determined, the torque calculating unit 152 may calculate target torque of a front wheel motor 2 based on the opening degree of the accelerator pedal (S602).

According to an embodiment of the present disclosure, the torque calculating unit 152 may calculate the target torque of the front wheel motor 2 by multiplying the required torque according to the opening degree of the accelerator pedal by a sensitivity factor SF according to the opening degree of the accelerator pedal and a weight factor WF according to the cumulative count value K.

Specifically, the torque calculating unit 152 may extract the sensitivity factor SF according to the opening degree of the accelerator pedal with reference to a relationship 152b between the opening degree of the accelerator pedal and the corresponding sensitivity factor, and may calculate the target torque of the front wheel motor 2, by multiplying the extracted sensitivity factor SF by the required torque described above using a multiplier 152c as described above.

Thereafter, the torque calculating unit 152 may calculate the target torque according to the cumulative count value K by multiplying the calculated target torque by a weight factor WF according to the cumulative count value, where the weight factor WF may have a value proportional to the cumulative count value to reach the target torque when the cumulative count value K becomes a second cumulative count value K2, greater than the first cumulative count value K1, as described above.

Finally, the motor controller 120 may drive the front wheel motor 2 according to the calculated target torque (S603).

As described above, according to an embodiment of the present disclosure, the driver's intention to exit drift driving may be determined based on the opening degree and the steering angle of the accelerator pedal in a vehicle during drift driving, and thereafter, the front wheel motor may be driven by calculating the target torque of the front wheel motor based on the opening degree of the accelerator pedal, such that it is possible to exit drift driving.

In addition, according to an embodiment of the present disclosure, when calculating the above-described target torque, a magnitude of the required torque preset according to the opening degree of the accelerator pedal may be multiplied by a sensitivity factor according to the opening degree of the accelerator pedal, thereby accurately setting the target torque of the front wheel motor required for exiting drift driving.

In addition, according to an embodiment of the present disclosure, the target torque applied to the front wheel motor may be smoothly increased by multiplying the above-described target torque by a weight factor according to the cumulative count value, thereby preventing nonlinear behavior of the vehicle due to abrupt torque application.

Figure 7:
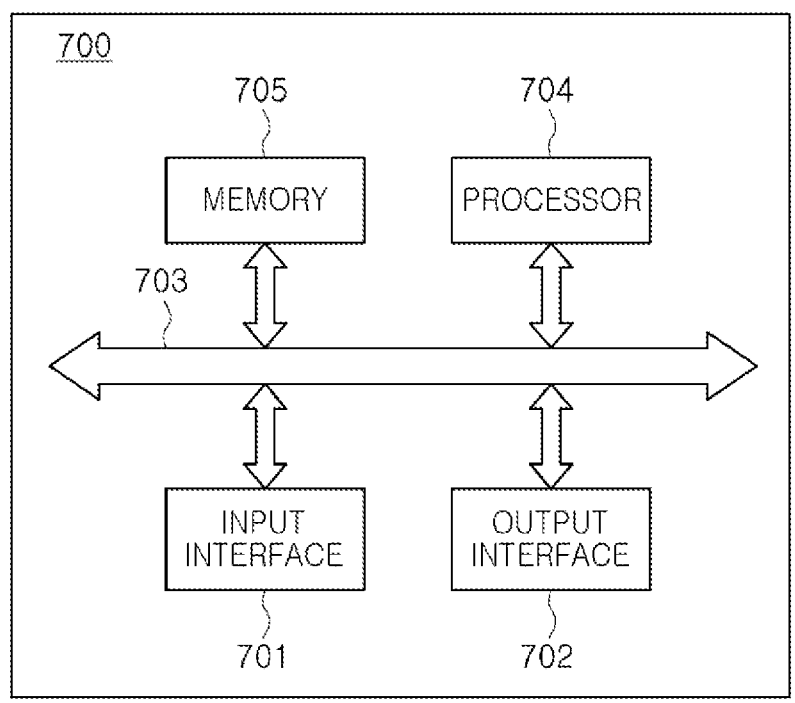
FIG. 7 is a block diagram of an apparatus for calculating torque according to an embodiment of the present disclosure.

Meanwhile, FIG. 7 is a block diagram of torque calculating apparatus according to an embodiment of the present disclosure, and is a block diagram applicable to the torque calculating apparatus shown in FIG. 1.

As illustrated in FIG. 7, the torque calculating apparatus 700 may include an input interface 701, an output interface 702, a processor 704, and a memory 705, and the input interface 701, the output interface 702, the processor 704, and the memory 705 may be interconnected via a system bus 703.

In an embodiment of the present disclosure, the memory 705 may be used to store a program, an instruction or a code stored in the memory 705, and the processor 704 may perform a program, a command, or a code stored in the memory 705, control the input interface 701 to receive a signal, and control the output interface 702 to transmit the signal. The memory 705 described above may include read-only memory and random access memory, and may provide instructions and data to the processor 704.

In an embodiment of the present disclosure, the processor 704 may be a Central Processing Unit (CPU), and may be another general-purpose processor, a Digital Signal Processor (DSP), or an Application Specific Integrated Circuit (ASIC), a Field Programmable Gate Array (FPGA) or other programmable logic device, discrete gate or transistor logic device, discrete hardware component, or the like. A general-purpose processor may be a microprocessor, or the processor may be any conventional processor, or the like. The above-described processor 704 may perform the operation of the above-described torque calculating apparatus when executing the program, the instruction or the code stored in the memory 705.

In one implementation process, the method of FIG. 6 may be achieved by an integrated logic circuit of hardware in the processor 704 or an instruction in a form of software. The contents of the method disclosed in relation to the embodiment of the present disclosure may be implemented to be performed and completed by a hardware processor, or may be performed and completed by a combination of hardware and software modules of the processor. The software module may be disposed in a storage medium such as random access memory, flash memory, read-only memory, programmable read-only memory or electrically erasable programmable memory, registers, and the like. The corresponding storage medium is located in the memory 705, and the processor 704 reads information from the memory 705 and implements the contents of the above-described method in combination with hardware. In order to avoid duplication, detailed descriptions thereof will be omitted herein.

As set forth above, according to an embodiment of the present disclosure, in a vehicle in drift driving, a driver's intention to exit drift driving may be determined based on an opening degree of an accelerator pedal and a steering angle, and thereafter, by calculating target torque of a front wheel motor based on the opening degree of the accelerator pedal and driving the front wheel motor, it is possible to exit drift driving.

In addition, according to an embodiment of the present disclosure, when calculating the above-described target torque, the target torque of the front wheel motor required for exiting drift driving may be accurately set by multiplying a predetermined required torque according to the opening degree of the accelerator pedal by a sensitivity factor according to the opening degree of the accelerator pedal.

In addition, according to an embodiment of the present disclosure, the target torque applied to the front wheel motor may be smoothly increased by multiplying the above-described target torque by a weight factor according to the cumulative count value, thereby preventing non-linear behavior of the vehicle due to abrupt torque application.

While the example embodiments have been illustrated and described above, it will be apparent to those skilled in the art that modifications and variations could be made without departing from the scope of the present invention as defined by the appended claims.

What is claimed is:

1. An apparatus for calculating torque of a vehicle for exiting drift driving, the apparatus comprising:
   a processor;
   a non-transitory computer-readable storage medium storing a program which, when executed by the processor, causes the processor to perform:
      determining a driver's intention to exit drift driving based on an opening degree of an accelerator pedal and a steering angle, and
      calculating target torque of a front wheel motor based on the opening degree of the accelerator pedal when the intention to exit drift driving is determined; and
   a motor controller for driving the front wheel motor according to the calculated target torque.

2. The apparatus for calculating torque of a vehicle of claim 1, wherein the non-transitory computer-readable medium stores the program which, when executed by the processor, further causes the processor to perform: determining that there is an intention to exit drift driving, when the steering angle is less than a first reference steering angle and the opening degree of the accelerator pedal is greater than a first reference opening degree.

3. The apparatus for calculating torque of a vehicle of claim 1, wherein the non-transitory computer-readable medium stores the program which, when executed by the processor, further causes the processor to perform:
- counting a time at which the steering angle is less than a first reference steering angle, and the opening degree of the accelerator pedal is greater than a first reference opening degree and cumulate the same, and
- when a cumulative count value is greater than or equal to a preset first cumulative count value, determining that there is an intention to exit drift driving.

4. The apparatus for calculating torque of a vehicle of claim 3, wherein the non-transitory computer-readable medium stores the program which, when executed by the processor, further causes the processor to perform:
- counting a time at which the steering angle is less than a first reference steering angle and the opening degree of the accelerator pedal is greater than a reference opening degree, and
- when the steering angle is greater than a second reference steering angle, the second reference steering angle being greater than the first reference steering angle, resetting the cumulative count value.

5. The apparatus for calculating torque of a vehicle of claim 3, wherein the non-transitory computer-readable medium stores the program which, when executed by the processor, further causes the processor to perform: calculating the target torque by multiplying required torque according to the opening degree of the accelerator pedal by a sensitivity factor according to the opening degree of the accelerator pedal,
- wherein the sensitivity factor is a factor for changing a magnitude of the required torque according to the opening degree of the accelerator pedal.

6. The apparatus for calculating torque of a vehicle of claim 5, wherein the non-transitory computer-readable medium stores the program which, when executed by the processor, further causes the processor to perform: calculating target torque according to a cumulative count value by multiplying the calculated target torque by a weight factor according to the cumulative count value,
- wherein the weight factor according to the cumulative count value has a value, proportional to the cumulative count value so as to reach the target torque at a point in time at which the cumulative count value becomes a second cumulative count value, greater than the first cumulative count value.

7. The apparatus for calculating torque of a vehicle of claim 5, wherein the required torque according to the opening degree of the accelerator pedal is torque having a preset value distributed to the front wheel motor among total required torque according to the opening degree of the accelerator pedal.

8. The apparatus for calculating torque of a vehicle of claim 6, wherein the sensitivity factor according to the opening degree of the accelerator pedal and the weight factor according to the cumulative count value are implemented in a form of a linear function.

9. A method of calculating torque of a vehicle for exiting drift driving, the method comprising:
- a first operation determining a driver's intention to exit drift driving based on an opening degree of an accelerator pedal and a steering angle;
- a second operation calculating target torque of a front wheel motor based on the opening degree of the accelerator pedal, when the driver's intention to exit drift driving is determined; and
- a third operation of driving the front wheel motor according to the calculated target torque, performed by a motor controller.

10. The method of calculating torque of a vehicle of claim 9, wherein the first operation comprises an operation of determining that there is an intention to exit drift driving when the steering angle is less than a first reference steering angle and the opening degree of the accelerator pedal is greater than a first reference opening degree.

11. The method of calculating torque of a vehicle of claim 9, wherein the first operation comprises an operation of counting a time at which the steering angle is less than a first reference steering angle and the opening degree of the accelerator pedal is greater than a first reference opening degree and cumulating the same, and
- determining that there is an intention to exit drift driving when a cumulative count value is greater than or equal to a preset first cumulative count value.

12. The method of calculating torque of a vehicle of claim 11, wherein the second operation comprises an operation of counting a time at which the steering angle is less than a first reference steering angle and the opening degree of the accelerator pedal is greater than a reference opening degree, and
- resetting the cumulative count value, when the steering angle is greater than a second reference steering angle, the second reference steering angle being greater than the first reference steering angle.

13. The method of calculating torque of a vehicle of claim 11, wherein the second operation comprises an operation of calculating the target torque by multiplying required torque according to the opening degree of the accelerator pedal by a sensitivity factor according to the opening degree of the accelerator pedal,
- wherein the sensitivity factor is a factor for changing a magnitude of the required torque according to the opening degree of the accelerator pedal.

14. The method of calculating torque of a vehicle of claim 13, wherein the second operation comprises an operation of calculating target torque according to a cumulative count value by multiplying the calculated target torque by a weight factor according to the cumulative count value,
- wherein the weight factor according to the cumulative count value has a value, proportional to the cumulative count value to reach the target torque at a point in time at which the cumulative count value is a second cumulative count value, greater than the first cumulative count value.

15. The method of calculating torque of a vehicle of claim 13, wherein the required torque according to the opening degree of the accelerator pedal is torque having a preset value distributed to the front wheel motor among total required torque according to the opening degree of the accelerator pedal.

16. The method of calculating torque of a vehicle of claim 14, wherein the sensitivity factor according to the opening degree of the accelerator pedal and the weight factor according to the cumulative count value are implemented in a form of a linear function.

17. A non-transitory computer-readable storage medium storing a program which, when executed by a processor, causes the processor to perform the method according to claim 9.

* * * * *